Dec. 12, 1950  R. T. BLAKELY  2,533,309
CARD HANDLING MECHANISM
Filed Nov. 3, 1947  5 Sheets-Sheet 1

INVENTOR
Robert T. Blakely
BY Robert S. Dunham
ATTORNEY

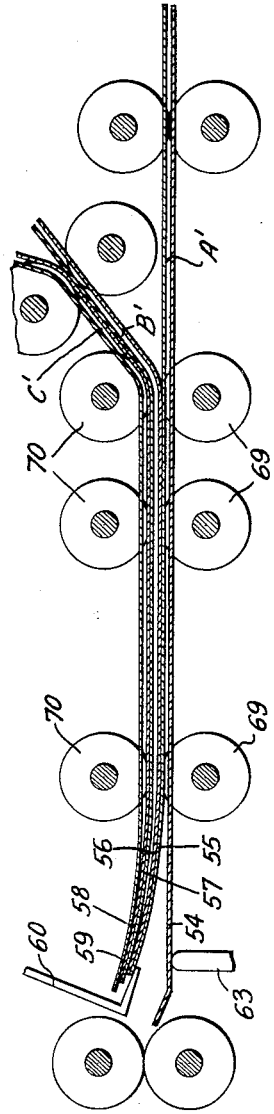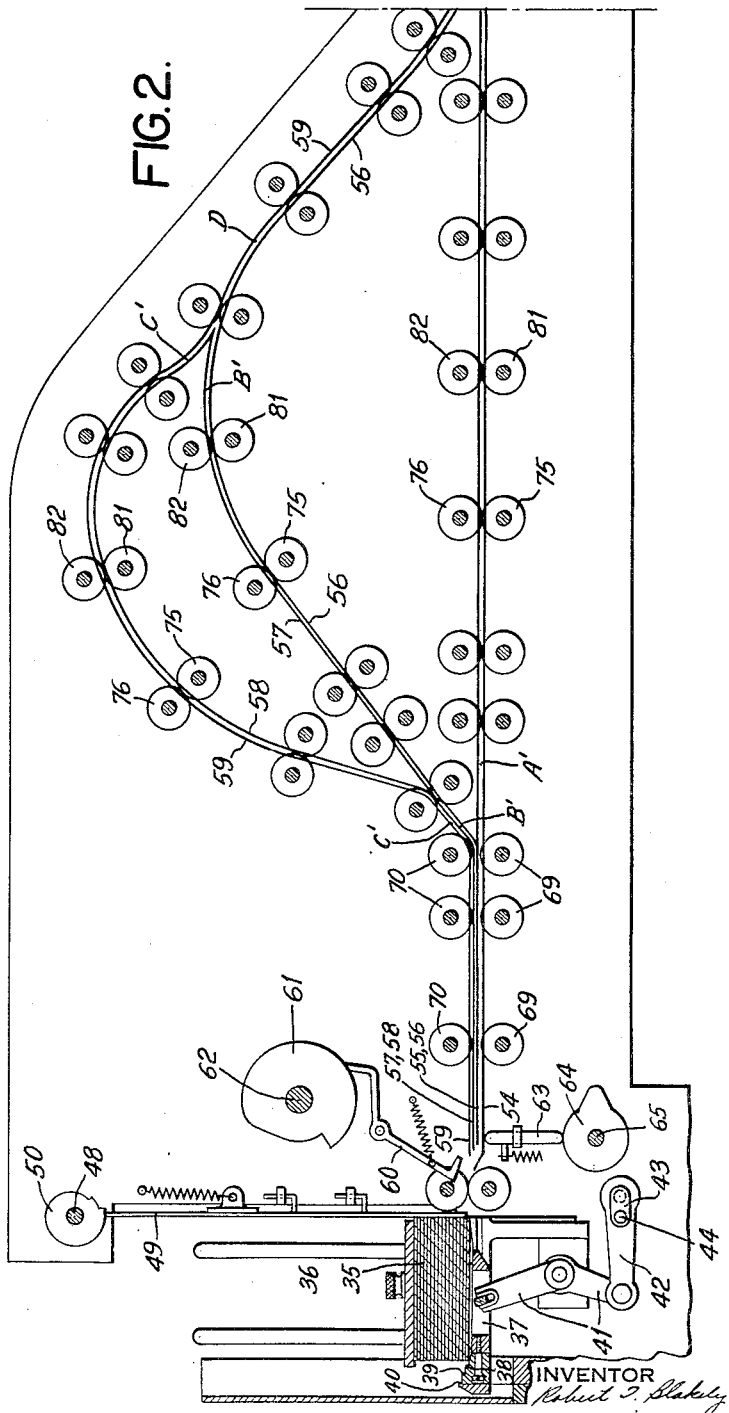

Dec. 12, 1950  R. T. BLAKELY  2,533,309
CARD HANDLING MECHANISM
Filed Nov. 3, 1947  5 Sheets-Sheet 3
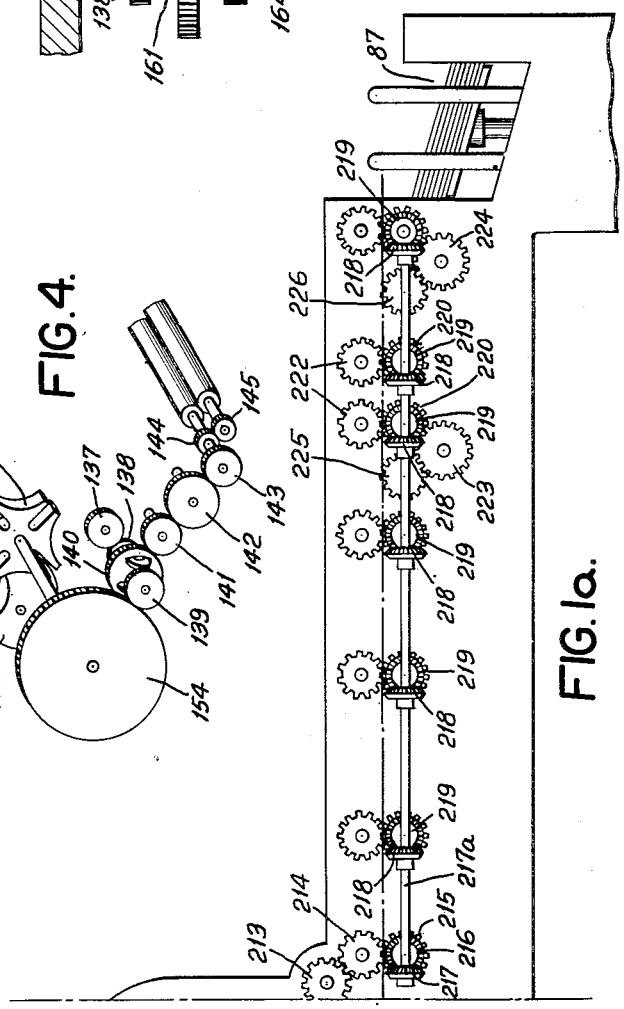
INVENTOR
Robert T. Blakely
BY Robert S. Dunham
ATTORNEY

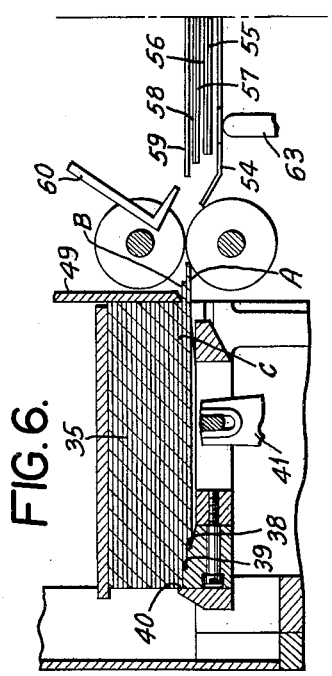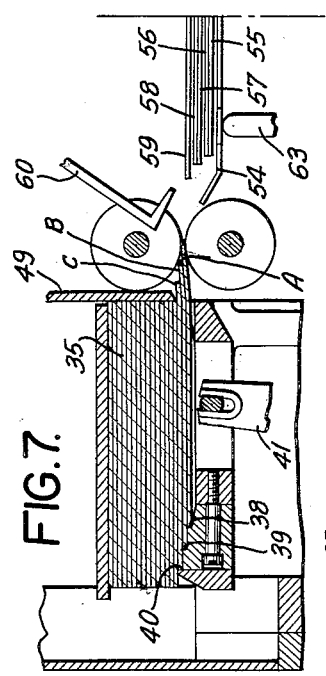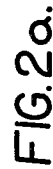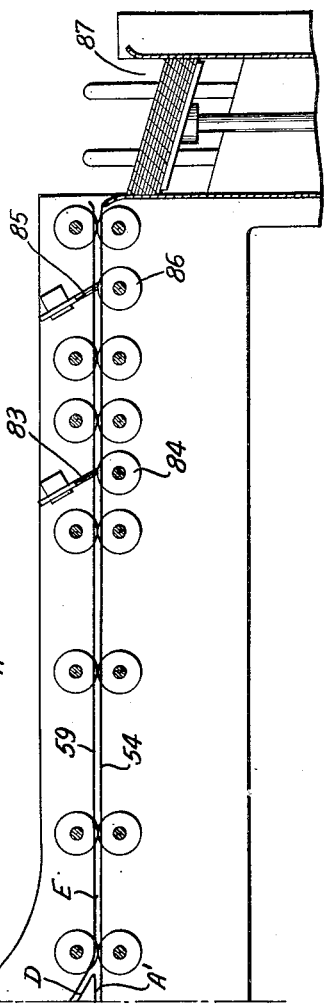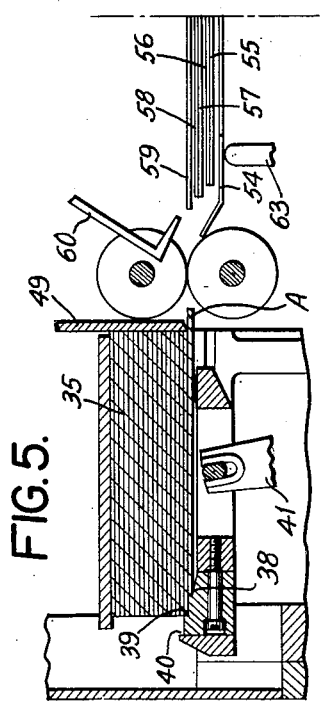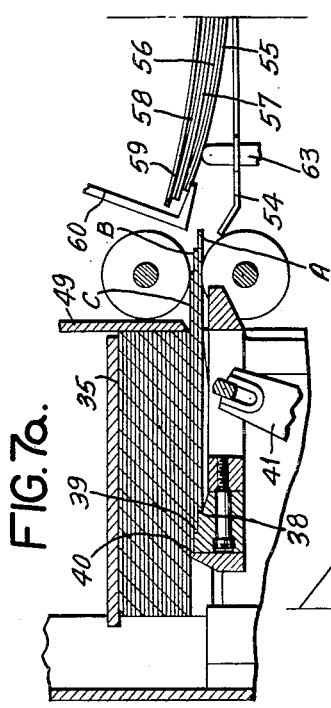

Dec. 12, 1950   R. T. BLAKELY   2,533,309
CARD HANDLING MECHANISM
Filed Nov. 3, 1947   5 Sheets-Sheet 5

INVENTOR
Robert T. Blakely
BY Robert S. Dunham
ATTORNEY

Patented Dec. 12, 1950

2,533,309

UNITED STATES PATENT OFFICE 2,533,309

CARD HANDLING MECHANISM

Robert T. Blakely, Amityville, N. Y., assignor to International Business Machines Corporation, New York, N. Y., a corporation of New York Application November 3, 1947, Serial No. 783,679

9 Claims. (Cl. 235—61.6)

This invention relates to improvements in card handling mechanism for record control machines.

Heretofore in the record controlled art it has been known that card analyzing could be effected at extremely high speed. A limiting factor heretofore has been the picking of the cards from the supply stack. High picker speeds have tended to damage the cards. The speed of card analyzation has accordingly heretofore been limited by the picker speed. According to the present invention, instead of picking cards singly as heretofore, provision is made for picking a plurality or group of cards from the card supply at each picker operation. Provision is also made for picking the cards in the group sequentially and for thereafter simultaneously advancing the cards of the group. Thereafter the group of picked cards are advanced to card conveying mechanism which operates at normal card speed. After the cards are in motion at normal card speed, the cards in each group are diverged for subsequent travel in separate paths. When the cards are travelling in the separate paths, provision is made for increasing the speed of card travel substantially above normal card speed. According to the present embodiment wherein three cards are picked in a group, the increased card speed is three times normal card speed. Preferably also provision is made for gradually accelerating the card speed from normal speed to increased speed. After the cards are travelling at increased speed in the separate paths, the paths are again merged for subsequent card travel in a common path. Provision is also made whereby the cards from the separate paths enter the common path in succession and in the same succession in which the cards were initially sequentially picked. The successive entry of the cards in the common path is attained by shaping the separate paths so that they are of different lengths and by the conveying of the cards in the separate paths at increased speeds. The increased speeds of travel in the separate paths provide the proper interval between the first card of one group and the first card of the following group when the cards again travel in the common path. This interval is such that the second card of the first group will follow the first card of the group, and the third card will follow the second card. Following the third card of the first group in sequence is the first card of the second group, and so on.

After the cards are merged to travel in the common path, and when they are still travelling at increased speed, provision is made for analyzing the cards. Thereafter the cards are delivered to the usual stacker mechanism.

It is a further object of the present invention to provide novel means for causing the cards to enter the single path in succession. This means includes card conveying means to advance the cards at the speed of travel of the cards from one rate to a higher rate at a point intermediate the supply stack and a point where the cards again merge into a common path. Cooperating with the high speed card conveying means just mentioned, separate paths are shaped to afford paths of different lengths in each of the separate paths. With this construction the card following the shortest path reaches the merged path first. The card travelling the next longer path reaches the merged path second, and follows the first card, and so on. After the cards have been merged in a single path, provision is made for sensing the cards and sensing is effected in the merged path when the cards are travelling at a rate which is higher than the normal rate.

In the drawings:

Figures 1 and 1a taken together with Figure 1a to the right of Figure 1 shows a side view of the machine and further shows certain parts of the drive mechanism;

Figs. 2 and 2a taken together with Figure 2a to the right of Figure 2 shows a central sectional view of the machine;

Fig. 2b is an enlarged detail view of certain parts which are shown in Fig. 2 but at slightly different position which they assume at a later period in the cycle of machine operation;

Fig. 3 is a top plan view of certain parts shown in Figure 1, the view being taken substantially on line 3—3 of Figure 1;

Fig. 3a is an enlarged detail view of a portion of certain parts of Fig. 3;

Fig. 4 is an isometric view showing certain parts of the drive mechanism;

Figure 1:
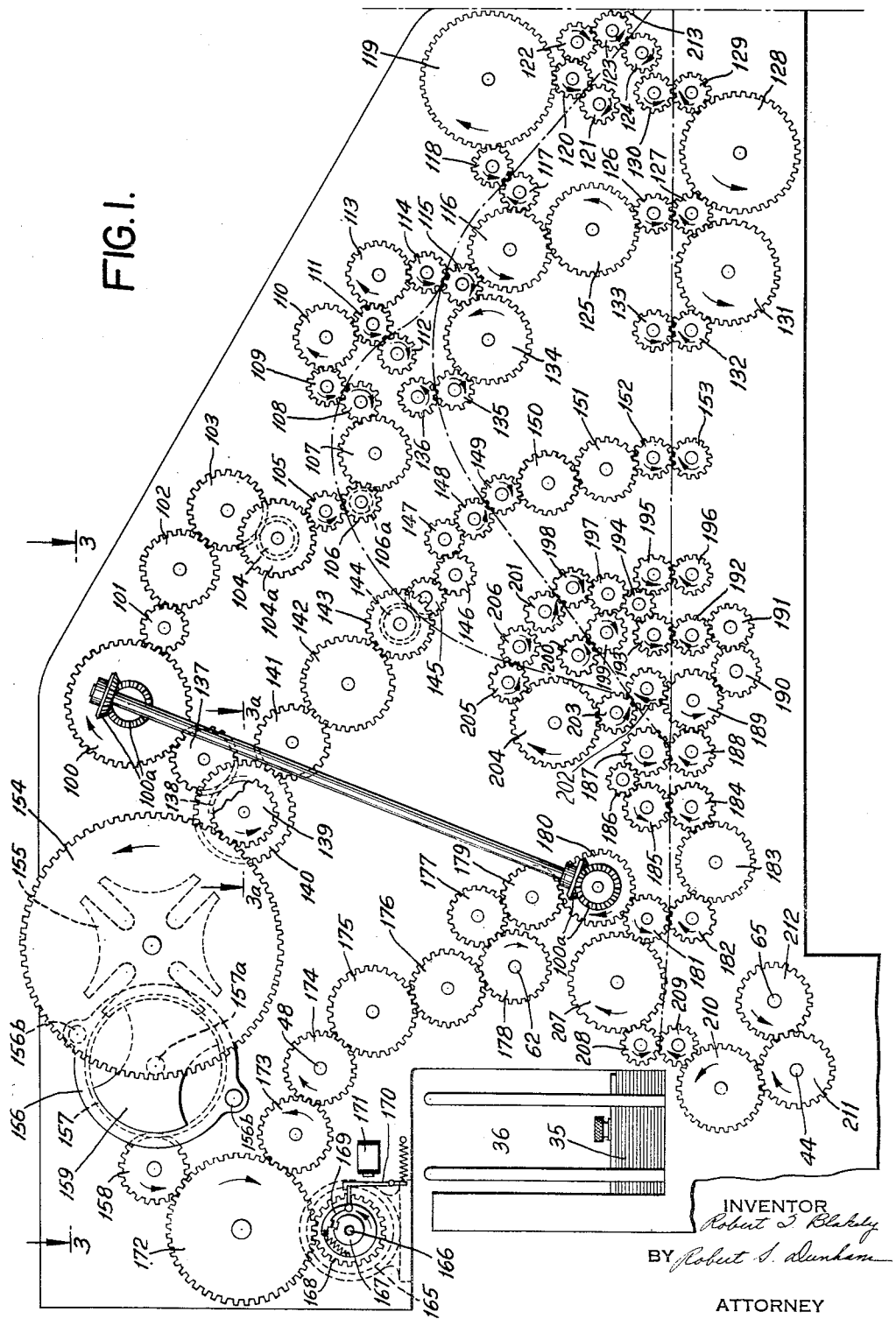

Figs. 5 to 10 inclusive are a series of detailed views of the card picking mechanism showing successive steps in card picking operations.

In ordinary record control machines it is customary practice to place the cards in a feed hopper and such cards by the customary picker are removed one at a time and fed by feed rolls which advance the cards past analyzing brushes to a stacker mechanism.

In the present machine, instead of removing cards singly from the feed hopper as heretofore, a plurality of cards are picked concurrently. In the embodiment herein disclosed, three cards are picked concurrently. After the three cards are picked, provision is made to divert the three cards into individual feed chutes. Suitable card feeding mechanism is provided for each of the individual feed chutes. In the individual feed chutes, each card is accelerated to three times its normal speed. The feed chutes are also of different lengths. The feed chutes are also arranged to again merge the cards which are fed in separate paths back into a single path. The arrangement is such that the lowermost card which is picked from the supply stack is the first card to enter the single chute. Following this card, the second card from the bottom of the supply stack enters the single chute and thereafter the third card. The cards are then fed forward in the single or merged chute past an analyzing mechanism and in their transit past this analyzing mechanism the cards pass the analyzing brushes at three times their normal speed.

Referring now to Figure 2, 35 designates a stack of record cards disposed in the usual hopper 36. 37 is a picker. This picker is provided with notched portions designated at 38, 39 and 40 (see also Fig. 5). As will be seen from Figure 5, the notch 38 picks the lowermost card, notch 39 picks the second card from the bottom, and the notch 40 picks the third card from the bottom. For convenience in the subsequent description, the lowermost card will be designated "A," the second card from the bottom "B," and the third card from the bottom "C." The picker 37 is actuated by a bell crank 41 which is oscillated by an arm 42 which, in turn, is actuated by crank 43 driven from shaft 44. One complete rotation of shaft 44 will move the picker from the position shown in Fig. 5 successively through the positions shown in Figs. 6 to 10 inclusive. Referring again to Figure 2, a gate 49 is provided on the right hand side of the hopper 36. This gate is urged by a spring upwardly against a cam 50 which makes one revolution for each card feeding cycle. As explained heretofore, three cards are picked in one card feed cycle. Disposed to the right of the hopper 36 are a series of 6 flexible chute blades which are respectively numbered 54 to 59 inclusive. See also Fig. 2b. As shown in Fig. 2 the chute blades 55 to 59 inclusive are all initially in a down position. Slightly later in the machine cycle (see Figs. 2b and 7a) these chute blades are held in a latched up position by a bell crank latch 60. The bell crank is centrally pivoted and the opposite end of this bell crank is urged against a cam 61 mounted on a shaft 62 which rotates through a complete revolution once each card cycle. Disposed below the lowermost chute blade 54 there is a plunger 63 which is spring urged against a cam 64 mounted on shaft 65. Shaft 65 rotates through one complete revolution on each card feeding cycle. The cam 64 and plunger 63 shift the chute blades from the position shown in Fig. 2 to that shown in Fig. 2b. When in the latter position they are latched up by latch 60. For feeding the cards through the chute blades, the machine is provided with a series of lower feed rolls 69 and a series of upper feed rolls 70. The feed rollers are so driven and proportioned that they will feed a card a distance of $16/13$ of its width during a card feed cycle. A card will be assumed to have 13 units or index points in its width and the card will be fed 16 index points in a card feed cycle. Accordingly there will be 3 index points of spacing between cards.

At the start of a card feed cycle, the parts will be in the position shown in Fig. 2. With the parts in this relation, the opening between the gate 49 and the bottom of the card hopper is just sufficient to permit passage of a single card. Upon starting the machine by the operator, in a manner to be hereinafter described, the shafts 44, 46, 62 and 65 begin to rotate. The feed rolls 69 and 70 also rotate. The picker 37 moves to the right, whereupon the lowermost notch 38 of the picker engages the "A" card. Shortly after the leading edge of the "A" card passes through the gate, the rear edge of the "B" card will be engaged by the notch 39 of the picker (see Fig. 5). By this time, cam 50 will have rotated to such an extent to permit the gate 49 to open sufficiently so that two cards, namely the "A" and "B" cards, can simultaneously pass through the gate. Shortly thereafter the third card from the bottom, namely the "C" card, will be engaged by the notch 40 of the picker (see Fig. 6) and under this condition the gate 49 under control of the cam 50 will permit three cards "A," "B" and "C" to be advanced through the gate. Figure 7 shows the position of the parts with the third card advanced slightly beyond the gate 49. Shortly thereafter, the plunger 63, which passes through a hole in chute blade 54, will be elevated to lift chute blades 55 to 59 to upper position (see Fig. 7a). In this position they will be latched up by latch 60.

Figure 8:
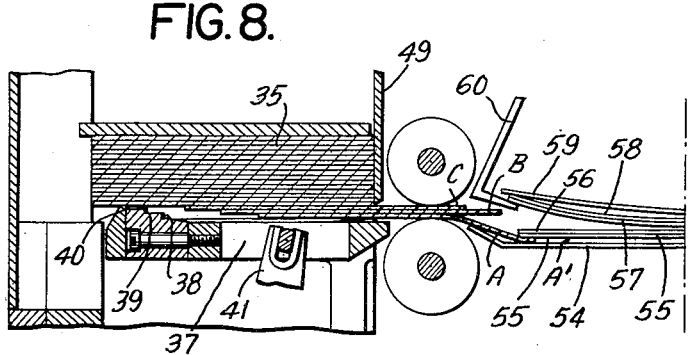
Figure 9:
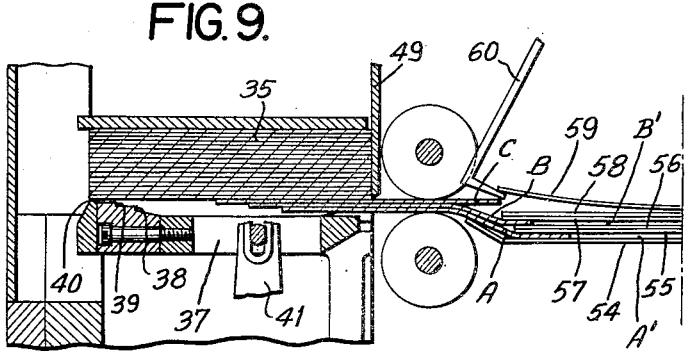

Cards "A," "B" and "C" will continue to be fed by the picker until the leading edge of the "A" card is slightly to the right of the left-hand ends of chute blades 55 and 56. By this time the latch end of the bell crank lever 60 will have moved sufficiently to the left (see Fig. 8) to permit chute blades 55 and 56 to snap down over the leading edge of the "A" card. The card path between the lowermost chute blade 54 and the next chute blade 55 will define a card path which will hereinafter be designated "A'." It is this path A' which receives the "A" card. Figure 8 shows the "A" card just entering the A' path. The lower end of chute blade 55 will deflect the leading edge of the "A" card below the level of the bottom of the hopper. Card feed continues and subsequently the latch end of the bell crank 60 will have moved sufficiently to the left to permit blades 57 and 58 to snap down on the leading edge of the "B" card (see Fig. 9). After another short interval, the latched end of bell crank 60 will be further displaced to permit chute blade 59 to snap down over the leading edge of the "C" card.

Figure 10:
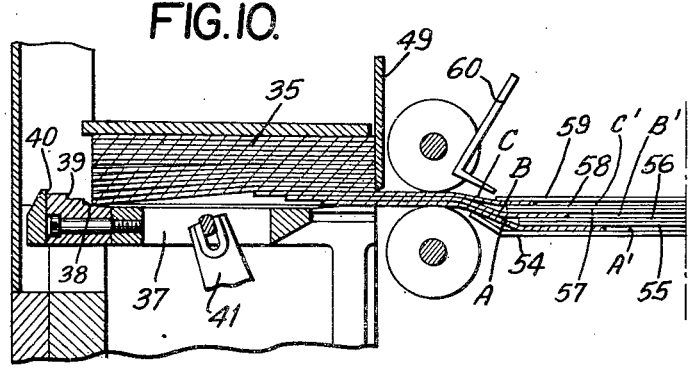

Referring to Fig. 10, it will be noted that the "A" card is in the A' path between chute blades 54 and 55; the "B" card is in the B' path between chute blades 56 and 57; and the "C" card is in the C' path between chute blades 58 and 59. The cards continue to be fed under the drive of feed rolls 69 and 70. Just beyond the third set of feed rolls 69 and 70, the chute blade paths B' and C' diverge from the A' path. The A' path is continued as a straight path, whereas the B' and C' paths are curved paths. The cards continue to move in their individual paths A', B' and C' and eventually they simultaneously reach pairs of feed rollers designated 75 and 76. These particular feed rollers may be termed accelerated feed rolls and while under the control of these rolls the cards will be speeded up from their initial speed under control of rolls 69 and 70 to three times this speed. When the various cards enter the accelerated rolls, such cards will be moving at their initial rate, namely, their rate of movement under control of rolls 69 and 70.

Thereafter, rolls 75 and 66 accelerate the card movement. This acceleration is effected by a Geneva movement mechanism which will be subsequently explained. After the cards have been accelerated by the rolls 75 and 76 to three times their initial or normal speed, cards will enter other feed rolls designated 81 and 82. Such rolls rotate at three times normal or initial speed. It will be understood that there are several sets of the feed rolls 81 and 82 for each of the various paths. Feed chutes B' and C' combine into a single feed chute path D, as shown in Figure 2. This feed chute path D is bounded at its top by the uppermost chute blade 59 and its bottom by chute blade 56. Further on feed chute path D merges with feed chute path A' into a single feed chute path E. Feed chute path E is formed by blade 59 at the top and at the bottom by blade 54.

In normal accounting practice with record cards it is the accepted practice to pass cards in succession past an analyzing station and accordingly with the present arrangement provision should be made so that the "A" card will be the first card to enter the E path. Also the "B" card should enter the E path following the "A" and the "C" card should enter the A path following the "B" card.

To attain this result, the length of the B' path plus the length of the D path to the junction point with the E path is made longer than the length of the A' path to the junction point. According to the present embodiment this difference in length is the distance occupied by 15 index points. Similarly, the C' path plus the D path to the junction point with the E path is 15 index points longer than the length of the B' path plus the length of the D path. Summarizing, the length of the various chute paths are such that the cards end up and pass through the E path with the leading edge of card "A" 16 index points ahead of the leading edge of card "B" and with the leading edge of card "B" 16 index points in advance of the leading edge of card "C." While in the E path, the cards are fed past the usual first and second analyzing brushes and contact rolls 83, 84 and 85, and 86, to the usual discharge hopper or stacker 87.

Having described generally the principles of card selection by the picker, card divergence into the various chute paths, card acceleration and the re-merging of cards into a single path, the manner of driving the various mechanisms will be briefly described.

Referring now to Fig. 1, 165 designates a main driving motor. This motor had a drive shaft 166 which in turn drives the notched element of a 1-revolution clutch. Freely rotatable on shaft 166 is a gear 168 carrying a clutch dog 169 which is normally held out of engagement with the notched element 167 by a latch 170. Energization of a card feed clutch magnet 171 will release dog 169 to cause gear 168 to rotate.

The manner of energizing the card feed clutch magnet need not be described since such magnetic card feed clutches are well known in this art.

Gear 168 meshes with gear 172 which in turn, through intermediate gears 173 and 174, causes rotation of shaft 48. Shaft 48 (see Fig. 2) is the shaft which carries the cam 50 which controls the throat gate. The driving relation between gears 168, 174 is such that gear 174 makes one complete revolution for each rotation of gear 168. Gear 168 makes one complete revolution for each card feed cycle. A card feed cycle may be also defined as the time required for picker 37 to operate once feeding three cards from the supply hopper and for restoration of the picker to starting position.

Referring to Fig. 1 further gearing 175, 176, and 178 is provided for rotating shaft 62. Shaft 62, it will be recalled (see Fig. 2), is the shaft carrying cam 61 which is the chute blade latch cam. This cam is rotated through one revolution during each card feed cycle.

Referring again to Fig. 1, further gearing 177, 179, 180, 181, 182, 207, 208, and 209 is provided. Gearing 181 and 182, 208 and 209 drive the first two sets of card feed rolls 69 and 70. These gears move the cards 16 points in each card feed style. Gearing 209, 210, and 211 rotate shaft 44 which shaft, it will be recalled referring to Fig. 2, is the picker drive shaft. Such picker drive shaft is actuated to make one revolution per card feed cycle.

Referring again to Fig. 1, gearing designated 183 to 206 inclusive is provided, this gearing serving to drive the remaining sets of feed rolls 69 and 70. Such feed rolls, it will be recalled, feed the cards up to the point where their movement is accelerated by the accelerating feed rolls 76 and 77.

Referring again to Fig. 2, gearing 211, 212 drives shaft 65. This shaft makes one revolution for card feed cycle and actuates a cam 64 which actuates plunger 63 to restore the chute blades 55 to 59 inclusive to their upper position in which they may be re-latched by the latch member 60.

Accelerating Roll Drive

Gear 158 (Fig. 1) drives the gear 157 which is fast to shaft 157a. Shaft 157a is the drive shaft of a Geneva drive which comprises a driving member 156 carrying two drive pins 156b. Also fast to shaft 157 is a Geneva locking member 159. Pins 156b cooperate in the usual way with the slots in a combined Geneva driven and locking member 155. This driven member 155 is fast on a shaft which drives a gear 154. Gear 154 in turn drives a gear 139 (see Fig. 3a). Gear 139 has fast to it a gear 164 which is part of the differential gearing arrangement. This differential gearing includes two bevel gears 164 and 163 which cooperate with idler gears 161 and 162 carried on a central spider gear plate 140. Gear 163 is fast to gear 138. Gear 138 (see Fig. 1) in turn is geared through gears 137, 100 and bevel gearing generally designated 100a back to gear 180. Gear 180 makes one revolution for each card feed cycle and is driven at the normal or initial card speed. Assume gear 138 to be driven at a driven speed. If gear 139 attains twice that speed the effect will be to accelerate the drive on the spider 140 and to drive the spider 140 at three times the normal card speed. It will be further recalled that gear 139 derives its drive through the Geneva mechanism which gives a gradual acceleration from zero to twice normal card speed. (See also Fig. 4.)

Referring again to Fig. 1, gear 140 in turn drives gear 141 which, through gearing 142, 143, 144 and 145 drives accelerating rolls 75 and 76 in the C' path (see Fig. 2). Gearing 147, 148, and 149 is provided to drive the accelerating rolls 75 and 76 in B' path (see Fig. 2). Gearing 150, 151, 152 and 153 is provided to drive the accelerating rolls 75 and 76 in the A' path, The accelerating action of the mechanism just described will be now further explained. Near the end of the cycle the "C" card will enter the feed rolls 75 and 76. At this time the Geneva mechanism will not be functioning as one of the pins 156b will have left its cooperating slot in the driven member 155. At this time the only drive imparted to the card feed rolls 75, 76 will be that drive derived through gears 109 and 137 and the card will continue to move at a normal rate. Shortly after the beginning of the next cycle a Geneva driving pin will engage the slot in the driven member 155 and the card between the rolls 75 and 76 will accelerate in speed due to the Geneva action. By the time the rear edge of the "C" card leaves the rolls 75, 76, the card will have been accelerated to three times its normal speed due to the action of the Geneva plus the drive derived through the differential. The "C" card will then enter the rolls 81 and 82 (see Fig. 2). These rolls 81 and 82 are driven at three times normal speed. The drive for such rolls 81 and 82 is provided as follows: Gear 100 (see Fig. 1) makes one revolution per card feed cycle and by means of suitable gears 101, 102, 103, 104, 104a, 105 and 106, feed rolls 81 and 82 in the C' path will be driven at three times normal speed. Gears 106a, 107 through 136 inclusive drive the remaining rolls 81 and 82 in the A', B', C' and D paths at three times normal speed. Drive for the feed rolls 81 and 82 in the E path is secured in the following manner: Gear 213 (Fig. 1) receives its drive from gear 123. 213 in turn drives 214 which in turn drives gear 215. 215 and 216 provide drive for the first pair of feed rolls in the E path. Bevel gear 217, which is driven from a bevel gear on 215, drives a shaft 217a. The shaft 217a carries a series of bevel gears 218 which in turn mesh with bevel gears 219 which are fast to the shafts which carry the lower feed rolls 81. Other spur gears 220 fast to these shafts drive the upper feed rolls 82 through gears designated 222. Idler gears 223 and 224 drive gears 225 and 226 which provide drive for the contact rolls 84 and 86.

Cooperating with these contact rolls 84 and 86 are the usual card analyzing brushes.

The following is a brief summary of the general mode of operation of the machine: During one picker operation three cards are picked from the supply stack. The picker mechanism is notched with one notch for each of the three cards. The picker advances the cards toward a set of chute blades and chute blade control mechanism is provided to direct the lowermost or "A" card into a lowermost chute path, to direct the next following or "B" card into an intermediate chute path, and direct the third card from the bottom, or "C" card, into an uppermost chute path. The chute paths are of progressively different lengths. The lower chute path is straight and the shortest; the next one or the middle chute path, or B' path, is slightly longer, and the top path is still longer. Cards are introduced into the chutes initially at what may be termed normal card speed. During transit through the chute paths, the cards are gradually accelerated to three times normal speed. After the cards have been accelerated to three times normal speed they are further advanced through the separate chute paths at three times normal speed. Ultimately, the cards are remerged into a single path and in this single path the cards travel at three times normal speed. They further enter the merged path in succession, the "A" card first, the "B" card following, and the "C" card next following. It will be further understood that immediately following the "C" card in the merged chute path, there will be a second "A" card and following the second "A" card there will be a second "B" card and next following a second "C" card, and so on for all of the cards in the supply hopper. By the above arrangement, provision is made for analyzing cards at three times normal card speed together with provision for picking cards at normal card speeds.

What is claimed is:

1. Card feeding mechanism for feeding cards from a supply stack to an analyzing station comprising in combination picker means for picking a plurality of cards from the supply stack, card separating means including chute blades for directing the picked cards into a plurality of paths, card handling means to move said cards in each of said plurality of paths, accelerating means to accelerate the speed of travel of the cards in said paths, means to merge the cards from the different paths into a single path which receives the cards, one after another in succession, means to move said cards in said single path at accelerated speed, and means to cause the cards emerging from the separate paths to enter the single path in succession.

2. Card feeding mechanism for feeding cards from a supply stack to an analyzing station comprising in combination, a card picker with means thereon to pick a plurality of cards from a supply stack, card separating and diverting means to receive a plurality of picked cards and to divert them for subsequent movement in separate paths, card conveying and card handling means to advance the cards in each of the separate paths, card directing means to direct cards received from separate paths into a single path, and means to cause the cards from separate paths to enter the single path in succession, one after the other, said means including means to provide a different length of card travel in each of the separate paths, card conveying means acting upon the cards in the separate paths for increasing the speed of travel of such cards and card conveying means for conveying the cards in the single path at increased speed.

3. The invention according to claim 2 wherein an accelerating means is provided for operating the card conveying means acting upon the cards in separate paths whereby the speed of travel of the cards in the separate paths is gradually accelerated to higher speed.

4. Card handling mechanism for feeding cards from a supply stack past an analyzing station to a discharge stack comprising in combination, picker means for picking a plurality of cards from the supply stack and advancing them in succession, a plurality of chute blades for receiving the cards and guiding them in separate paths, means controlling shifting of the chute blades to cause the entrance of the cards into separate paths, card conveying means to advance the cards in said separate paths, said card conveying means including means to first feed the cards at normal speed and means to thereafter feed the cards in their separate paths at increased speed, means including said chute blades to redirect the cards from the separate paths into a single common path which the cards enter in succession, one after the other, means for feeding the cards in said last-mentioned single path through the machine at said increased speed, said chute blades further defining paths of different lengths whereby the successive cards enter the single path in succession, and operating means for operating the picker means, the chute blade shifting means and the card conveying means.

5. A machine of the class described having a supply hopper for a stack of cards, and card conveying mechanism and including in combination, a stepped picker for picking a plurality of cards in succession from the bottom of the stack, a movable card gate positionable to different vertical positions in successive steps for successively releasing the cards one at a time for advance by the steps of the picker, and operating mechanism for the picker and for said movable card gate to provide a single picking movement of the picker and a plurality of steps of vertical upward movement for the movable card gate.

6. A machine of the class described having a card supply hopper, including in combination, a card gate, means for raising the gate step by step variable vertical extents to permit passage of leading edges of overlapped single cards in succession therethrough and means for urging the cards towards said gate.

7. Card handling mechanism for feeding cards from a supply stack past an analyzing station to a discharge stack comprising in combination, picker means for picking a plurality of cards from the supply stack and advancing them in succession, a plurality of chute blades for receiving the cards and guiding them in separate paths, means controlling shifting of the chute blades to cause the entrance of the cards into separate paths, card conveying means to advance the cards in said separate paths, said card conveying means including accelerating means to accelerate the speed of travel of the cards in said paths, means including said chute blades to redirect the cards into a single path which they enter in succession, one after the other, means for feeding the cards in said single path at the speed of travel to which they have been accelerated, said chute blades defining paths of different lengths whereby successive cards enter the single path in succession, and operating means for operating the picker means, the card conveying means, and the accelerating means.

8. Card handling mechanism for feeding cards from a supply stack, including, in combination, picker mechanism including a stepped picker for picking a plurality of cards in succession from said stack at a single operation of said picker, a variably positionable card gate, means for controlling the position of said gate to variably position it in a plurality of different vertical positions upon each operation of the stepped picker, and operating mechanism for said last mentioned means and for said picker mechanism to provide for the variable positioning of the card gate in different vertical positions upon each picking of a plurality of cards by the picker.

9. A card feeding mechanism for picking cards from a stack and for diverting the cards for travel in a plurality of paths, said mechanism including a stepped picker for picking a plurality of cards at one picker operation and for advancing them in overlapping relation, a movable card gate adapted to assume different vertical positions corresponding to the thickness of single and overlapped cards, a plurality of chute blades which upon successive release provide different card paths into which the picked cards enter, releasing means for releasing the chute blades in succession, and synchronizing operating means for coordinating the picker operations, the positioning of the card gate, and the releasing of the chute blades with one another, whereby upon each picker operation the individual cards which are picked as a group are advanced and directed into different card paths.

ROBERT T. BLAKELY.

REFERENCES CITED

The following references are of record in the file of this patent:

UNITED STATES PATENTS

| Number | Name | Date |
|---|---|---|
| 269,159 | Crowell | Dec. 12, 1882 |
| 1,251,852 | Winkley | Jan. 1, 1918 |
| 1,275,960 | Maynard | Aug. 13, 1918 |
| 2,181,211 | Sieg | Nov. 28, 1939 |
| 2,414,221 | Bristol | Jan. 14, 1947 |
| 2,493,858 | Carroll et al. | Jan. 10, 1950 |